April 17, 1928.
S. G. LING
1,666,460
PISTON RING TOOL
Filed Oct. 19, 1926
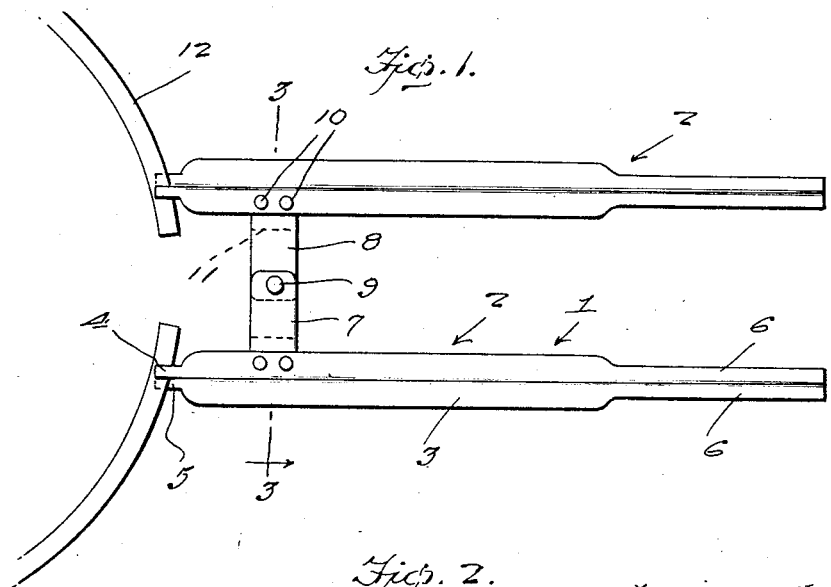
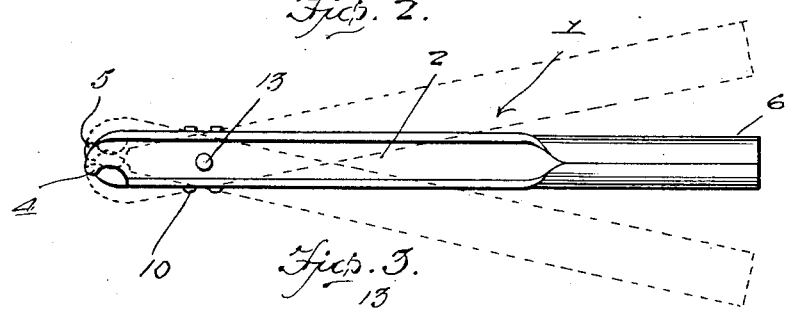
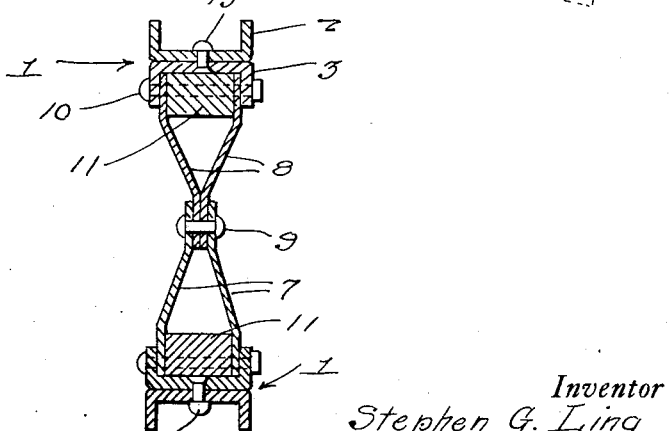
Inventor
Stephen G. Ling
By Clarence A. O'Brien
*Attorney*

Patented Apr. 17, 1928.

1,666,460

UNITED STATES PATENT OFFICE.

STEPHEN G. LING, OF SPOKANE, WASHINGTON.

PISTON-RING TOOL.

Application filed October 19, 1926. Serial No. 142,656.

This invention relates to an improved tool for expanding comparatively large piston rings of the kind larger than employed on the ordinary automobile piston, (upon tractor engine pistons and the like).

Rings of the character last referred to frequently measure from three-eights of an inch to seven inches in diameter and in some instances are as wide as one inch by twenty-four inches in diameter. Obviously, such size rings are rather inconvenient to handle, particularly with the ordinary kind of piston ring tool. The present invention, therefore, has reference to a metal tool designed for handling rings of this larger character.

Briefly, the invention has reference to a structure which includes two pairs of pliers including gripping jaws for the end portions of the ring, together with means connecting the pliers together to permit them to be moved towards and from each other in expanding the ring.

The features and advantages accompanying this arrangement will become more readily apparent from the following description and drawings.

In the drawings:—

Figure 1 is a top plan view of the tool showing the manner in which it is associated with the fragmentary portion of a piston ring, Fig. 2 is an edge elevation of the structure shown in Fig. 1, Fig. 3 is an enlarged vertical section taken approximately upon the plane of the line 3—3 of Fig. 1.

Referring to the drawings in detail it will be seen that the reference characters 1 and 2 designate the two complemental pairs of operating devices, each one of which is formed of a pair of pliers. Each device comprises a pair of duplicate members 2 and 3, each of which is of channel-shaped cross section as indicated in Fig. 3. At the inner ends these members are provided with hooked jaws 4 and 5. The opposite ends are rolled to form hand grips 6. A pair of connecting members 7 and 8 are employed and these are pivotally connected together as at 9. Each connecting member is made up of a pair of plates secured by rivets 10 which pass through the side flanges of the complemental channel-shaped members, filler blocks 11 being employed to maintain the parts in rigid assembled relation. The inner end portions of the parts of the members 7 and 8 come together in converging relation and the pivotal connection 9 is formed as better shown in Fig. 3.

In practice, it is obvious that the jaws 4 and 5 are engaged with the end portions of the ring 12 by swinging the levers 2 and 3 upon the pivotal connections 13. In fact, the two devices 1 and 2 are simply engaged as if they were separate pairs of pliers to the opposite ends of the piston ring. A firm grip is had, then the hand grips 6 of the respective pairs of pliers are held in the hands of the operator and the two devices are rocked towards each other upon the pivots 9 thus threading the ends of the ring 12 through the medium of the partial leverage thus obtained.

It is thought that by carefully considering the description in connnection with the drawings a clear understanding of the construction and operation of the invention will be had. Consequently, a more lengthy description is thought unnecessary.

While the preferred embodiment of the invention has been shown and described, it is to be understood that minor changes coming within the field of invention claimed may be resorted to if desired.

I claim:

1. A ring expanding and contracting tool comprising separate and independent ring-gripping devices, each device being formed of a pair of pliers and these pliers being made up of pivotally connected levers, the inner ends of the levers being fashioned to provide jaws for gripping the top and bottom edges of the ring and the opposite ends of the levers being fashioned to provide hand-grips, means extending at right angles from said devices for connecting the latter together, and a single pivotal connection between the parts of said means, said last named pivotal connection being at right angles to the pivotal connections between the levers of the respective devices.

2. A piston ring expanding and contracting tool comprising separate and independent ring-gripping devices, each device being in the form of a pair of pliers made up of pivotally connected levers, the inner ends of the levers being fashioned to provide jaws for gripping the top and bottom edges of the ring and the opposite ends of the lever being fashioned to provide hand-grips, a pair of duplicate connecting members rigidly secured to the inner levers of the devices and extending at right angles from the levers towards each other, and a single pivotal connection between the inner ends of said members, said last-named pivot being disposed at right angles to the pivotal connection between the respective levers of said gripping devices.

In testimony whereof I affix my signature.

STEPHEN G. LING.